United States Patent [19]
Fencl et al.

[11] 3,862,563
[45] Jan. 28, 1975

[54] TRUCK RIM FORMING APPARATUS

[75] Inventors: Vernon Fencl, Northbrook; Hans R. Luedi, Highland Park; Christian H. Stettler; Alberts Roze, both of Chicago, all of Ill.

[73] Assignee: Grotnes Machine Works, Inc., Chicago, Ill.

[22] Filed: Nov. 12, 1973

[21] Appl. No.: 414,721

[52] U.S. Cl. .............................. 72/403, 29/159.1
[51] Int. Cl. ............................................ B21d 53/26
[58] Field of Search ............ 72/401, 402, 403, 384, 72/332; 29/159.1; 228/13; 113/1 M, 7 R, 8, 116 D, 116 W

[56] References Cited
UNITED STATES PATENTS

| | | | |
|---|---|---|---|
| 1,816,534 | 7/1931 | Hume | 29/477 |
| 1,991,642 | 2/1935 | Turnquist | 72/384 |
| 2,337,901 | 12/1943 | Krueger | 113/7 R |
| 2,883,956 | 4/1959 | Nordquist | 113/8 |
| 3,091,202 | 5/1963 | Mackey | 29/159.1 |
| 3,552,629 | 1/1971 | Armbruster | 113/7 R |
| 3,675,460 | 7/1972 | Cavagnero | 72/402 |
| 3,759,203 | 9/1973 | Frankenberg | 113/120 M |

Primary Examiner—C. W. Lanham
Assistant Examiner—M. J. Keenan
Attorney, Agent, or Firm—Wolfe, Hubbard, Leydig, Voit & Osann, Ltd.

[57] ABSTRACT

A combination press apparatus for preparing partially formed cylindrical metal shells for welding of their end gaps wherein a workpiece operating station within a frame has a horn carrying first and second dies, a first ram having a die for forming is disposed adjacent to the first horn die and a power actuator moves the first ram toward the horn to form the shell ends adjacent the gap. A second ram disposed on the opposite side of the horn carries a closure die and a power actuator moves the second ram toward the horn to compress the opposite side of the shell against the second die to close the end gap. The first ram die may carry a cutter which acts in association with a cutting slot on the first die to trim the ends of the shell adjacent the gap. Lifting apparatus, including a self-centering arrangement, carries the shell and moves it into and out of the operating station surrounding the horn. The self-centering arrangement allows the shell to be moved eccentrically with respect to the horn for action by one of the rams or the other and the shell returns to the concentric position when the respective ram is retracted.

10 Claims, 13 Drawing Figures

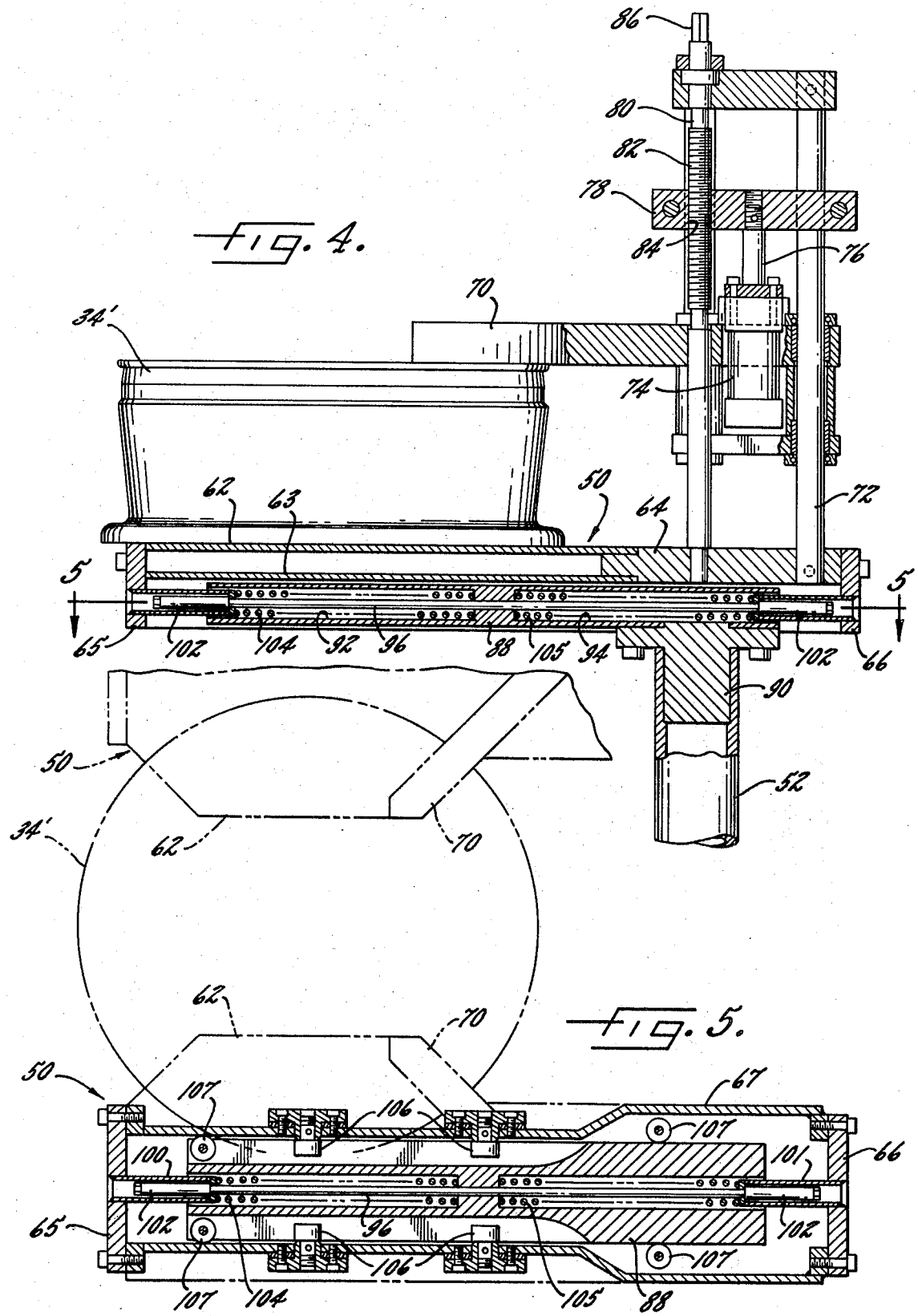

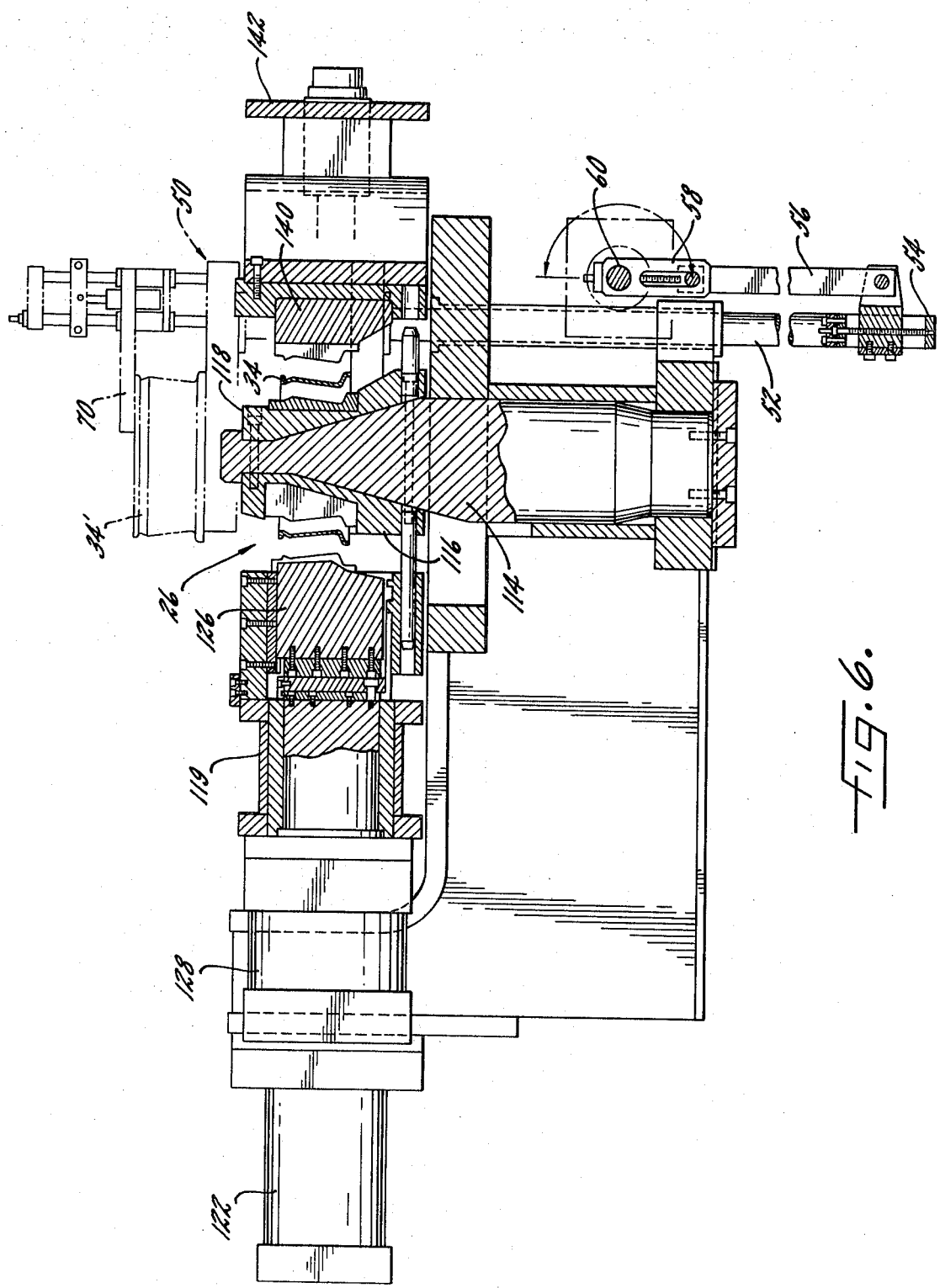

TRUCK RIM FORMING APPARATUS

RELATED APPLICATIONS

Vernon Fencl and Hans R. Luedi, Application Ser. No. 414,705 filed Nov. 12, 1973, on Automatic Truck Rim Weld Clean-up Process.

BACKGROUND OF THE INVENTION

The present invention relates generally to apparatus for pre-forming generally cylindrical metal shells preparatory to welding, and more particularly to an improved combination press apparatus for performing multiple forming operations on metal articles being fabricated into truck rims on a mass production basis.

DESCRIPTION OF THE INVENTION

There is disclosed and claimed in the aforementioned Vernon Fencl, et al. U.S. Application Ser. No. 414,705, a process for finishing or cleaning the welded area of shells for truck rims manufactured on a continuous mass production basis following the initial operations of forming the cylindrical shape from a pre-cut length of workpiece stock, preparing the cylindrical article for welding and then the welding itself.

As disclosed in the Fencl, et al. application, truck rims, as contrasted to automobile wheels that may be fabricated from flat sheet stock, are more desirably manufactured from a formed or shaped stock that in its "flat" or undeveloped state already includes the cross-sectional configuration of the finished truck rim. Such stock is so used because a lesser overall final weight of the truck rim can be obtained by having thicker sections in the areas where greater stress will be encountered and thinner sections provided where minimum or low stress areas occur.

Since the forming operation starts out with an elongated length of pre-formed metal which is coiled or otherwise formed generally into the cylindrical shell the ends as the article leaves the roll-former are warped or flared out. Thus, further forming, edge trimming and closing operations are required to prepare the cylindrical shell for welding. These procedures under ordinary circumstances require considerable handling and several pieces of manufacturing equipment to do the operations necessary to ready the shell for the welder.

In a manufacturing line having numerous forming machines more downtime and changeover time is required where different sized rims are to be manufactured in the same line.

Accordingly, it is the general aim of the present invention to provide an improved combination press apparatus which overcomes many or all of the foregoing disadvantages and which is characterized by the ability to perform the several different preparatory procedures to cylindrical articles for end welding with a minimum of required equipment to achieve the desired rates of mass production lines. While the present invention will find especially advantageous use in the formation of cylindrical shells for use in the production of truck rims, it is not so limited in its scope. Thus, the invention will also find use in the forming of cylindrical shells of variable cross-sectional shapes for a wide range of products wherein such shells are needed for further production operations and particularly where it may be required to manufacture different sizes of the shells and to change over with some frequency.

Another object of the invention is to provide an apparatus for performing preparatory operations on cylindrical shells to ready the shells for end welding which is completely automatic in operation and characterized by its ability to form, on a repetitive basis, a variety of shells of different diameters.

Still another object of the present invention is the provision of an improved preparatory forming apparatus for cylindrical shells which is capable of economically performing multiple operations and requires less equipment to keep up with the production rate and time for changeover from one size to another than with a plurality of individual pieces of equipment otherwise necessary to perform the preparatory operations.

Other objects and advantages of the invention will become apparent as the following description proceeds, taken in conjunction with the accompanying drawings.

DESCRIPTION OF THE DRAWINGS

FIG. 4 is an enlarged transverse sectional view taken along the line 4—4 in FIG. 3;

FIG. 5 is a sectional view taken substantially along the line 5—5 in FIG. 4;

FIG. 6 is an enlarged sectional view taken substantially along the line 6—6 in FIG. 3;

Figure 1:
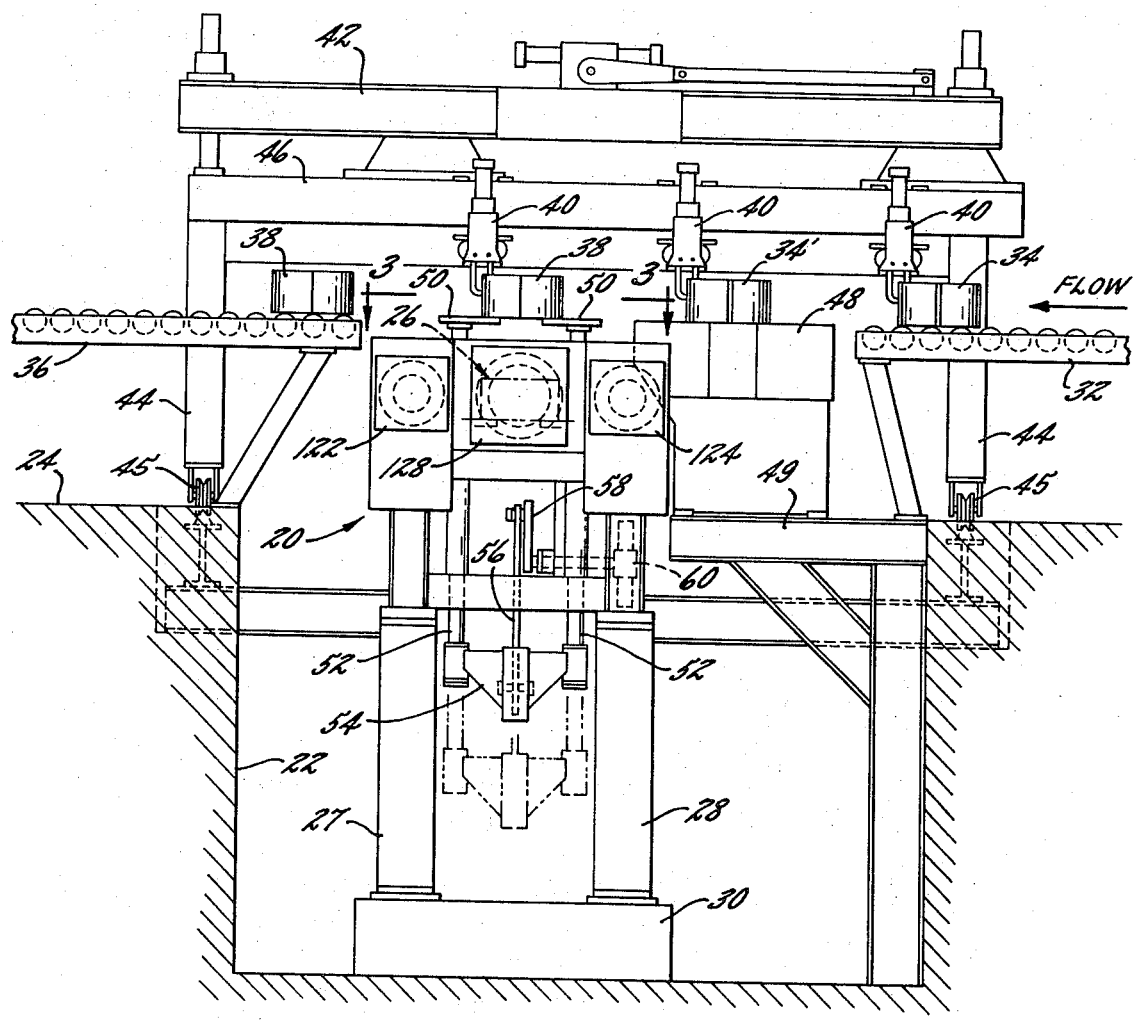
FIG. 1 is a side elevation of a combination press apparatus constructed according to the present invention, such apparatus here shown with conveyor arrangements for transporting partially formed shells to the apparatus and a cylindrical shell being positioned to be transported vertically to the forming apparatus.

While the invention is susceptible of various modifications and alternative forms, a specific embodiment thereof has been shown by way of example in the drawings and will herein be described in detail. It should be understood, however, that it is not intended to limit the invention to the particular form disclosed, but, on the contrary, the intention is to cover all modifications, equivalents and alternatives falling within the spirit and scope of the invention as expressed in the appended claims.

DETAILED DESCRIPTION

General Organization

Referring to the drawings, there is shown in FIG. 1 an exemplary combination forming apparatus, generally indicated at 20, embodying the present invention. The forming apparatus is adapted to be vertically oriented and mounted in a well 22 extending below the grade of a plant floor 24 so as not to require an exceptionally high ceiling or to place the product flow line at an impractical height above the floor. The forming apparatus has a work operating station, generally indicated at 26, located above the floor line 24 and supported by a frame consisting of upright columns 27, 28 which in turn are supported on a base or pad 30 located at the bottom of the well.

A roller conveyor 32 at the input side of the apparatus forwards the shells 34 that are to be worked on to a pickup point at one side of the apparatus. Out feed conveyor 36 on the opposite side receives the worked-on shells 38 and transports them to the welder (not shown).

In order to move the shells between the infeed and out feed conveyors 32, 36, a transfer apparatus is provided including a plurality of transfer clamps 40 carried by an overhead cross frame 42. The cross frame 42 is mounted on vertical columns 44 which include a wheel and track arrangement 45 to permit the transfer apparatus to be moved out of the way for access to the forming apparatus 20.

The transfer clamps 40 move along a crossbeam 46 to carry the shells horizontally and each of the transfer clamps is capable of being moved vertically for pickup and placement of the shells.

Disposed between the infeed conveyor 32 and the forming apparatus 20 is an orienter 48 supported by a beam structure 49 with the arrangement being such that shells 34 are sequentially picked up from the infeed conveyor 32 by transfer clamps 40 and first dropped off on the orienter to insure that the end gap of the partially formed shell is appropriately positioned for receipt by the forming apparatus 20. The orienter 48 is of a conventional rotary type known to those skilled in the art.

Workpiece Loading, Clamping, and Centering Apparatus

In order to receive a shell 34 at the product flow line above the operating station 26 and then lower the shell into the operating station and return it after completion of the forming, there is provided a lifter mechanism including a pair of centering slides 50 supported on rods 52, the lower ends of which are interconnected by a yoke 54. To raise and lower the lifter mechanism, a link 56 having a pin connection to the yoke 54 at one end and a pin connection to a crank 58 at the other end, is driven by a rotary actuator 60.

As best shown in FIG. 4, the lifter slides 50 include a platform structure fabricated from spaced apart flat members 62, 63 respectively secured to a slide block 64. The slides also have end flanges 65, 66 and side flange members 67, 68 (FIG. 5).

Referring to FIG. 4, each slide 50 is provided with a clamp arm 70 slideably supported on an upstanding rod 72 projecting upwardly from slide block 64. In order to shift the arm 70 vertically for clamping and releasing the shell 34 with respect to the upper slide member or platform 62, adjustable clamp means is provided. The clamp means consist of a fluid operated cylinder 74 carried by the arm member 70 with the actuator rod 76 of the cylinder being attached to an adjustment member 78 slideably carried by upstanding rod 72. To fixedly position the adjustment member 78 and therefore set the height of the clamp arm, there is provided an upstanding adjusting rod 80 having a threaded portion 82 which receives a correspondingly threaded opening 84 in slide member 78. At the upper end of the adjusting rod 80 there is a suitable drive connector 86 to receive a handle or drive socket to rotate the rod 80. Thus, by rotating the rod 80 the adjustment member 78 can be positioned along the threaded portion 82 to set the height of the clamp arm 70 above the platform 62. Once the slide 78 is set, the travel of the cylinder 74 serves to move the arm 70 up and down for clamping and unclamping a predetermined width shell received on the lifter apparatus.

In order to automatically center the rim or shell 34 in the forming apparatus operating station 26 as it is held on the lifter slides 50, the slides 50 are mounted to the lifter rods 52 by way of a self-centering arrangement. As shown in FIGS. 4 and 5, each lifter rod 52 is connected to an arm 88 via a coupling member 90. The arm 88 has counterbores 92, 94 extending longitudinally from opposite ends and a rod member 96 passes through the arm with the opposite ends of the rod 96 being coupled to respective end flanges 65, 66 of the centering slide 50.

The connection of the rod 96 ends to the respective slide end flanges is by meanss of a sleeve 100, 101 with the rod ends carrying resilient members 102. Springs 104, 105 disposed in the counterbores 92, 94 surround the rod 96 and their ends bear against the central reduced diameter portion of the arm 88 and the respective ends of the sleeves 100, 101. The arrangement is such that the centering slide, when moved with respect to the arm 88 in one direction or the other, compresses one of the springs 104, 105 at one side of the rod 96 and the tendency is always to restore the slide 50 to a neutral centered position with equal compressive forces on the springs.

In order to provide for easy relative movement between the slide 50 and the arm 88, rollers 106, 107 are carried by the respective elements and engage one another.

Cylinder Edge Forming Apparatus

Figure 2:
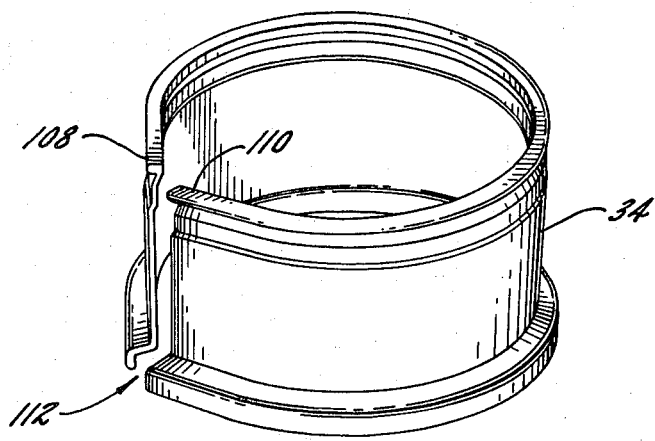
FIG. 2 is an enlarged perspective view of a shell of the type on which the apparatus of FIG. 1 operates.

In accordance with one of the aspects of the present invention, provision is made for receiving the partially formed shell or rim 34 and subjecting it to a first forming operation which rounds the partially formed shell adjacent the ends thereof. Thus, referring to FIG. 2, it may be seen that the shell or rim 34 as received from the roller or coiler station has flared ends 108, 110 adjacent the gap 112 where the seam is to be formed.

Figure 3:
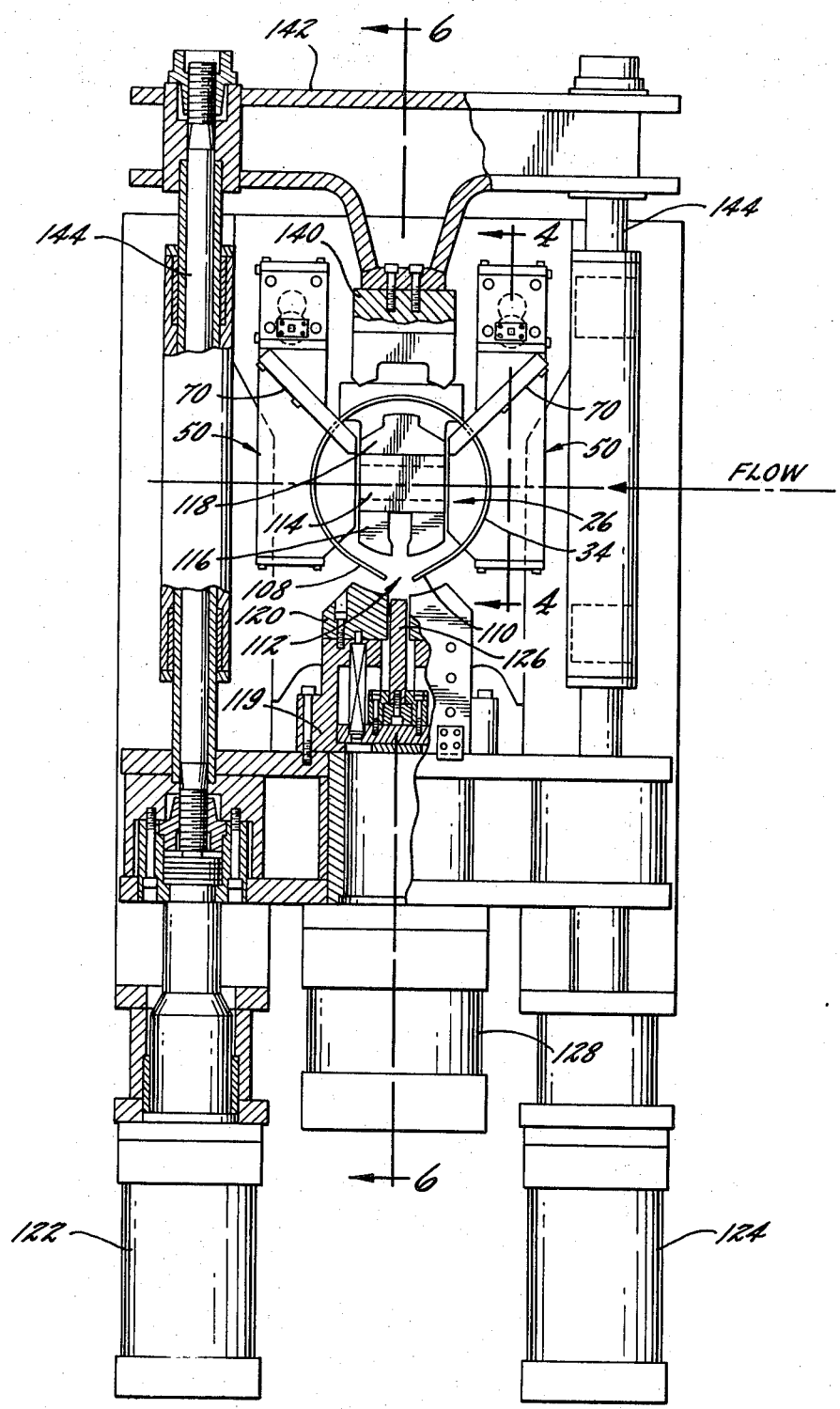
FIG. 3 is an enlarged transverse sectional view taken substantially along the line 3—3 in FIG. 1, but with portions removed for purposes of clarity.

The forming machine has, in the operating station 26, a centrally located horn 114 (FIGS. 3 and 6) which carries on the opposite sides thereof dies 116, 118 having a complementary shape to that of the inner peripheral configuration of the shell 34. The horn with its dies is a smaller diameter than the shell article so that the shell when centered over the horn is not in contact with either of the dies and there is considerable space even for shells of smaller or larger diameters to be received over the same horn. With the shell held by the lifter mechanism centered over the horn, the shell may be moved together with the slides 50 to an eccentric position at one side of the horn or the other where the inner peripheral surface of the shell engages one of the dies 116, 118.

Figure 7:
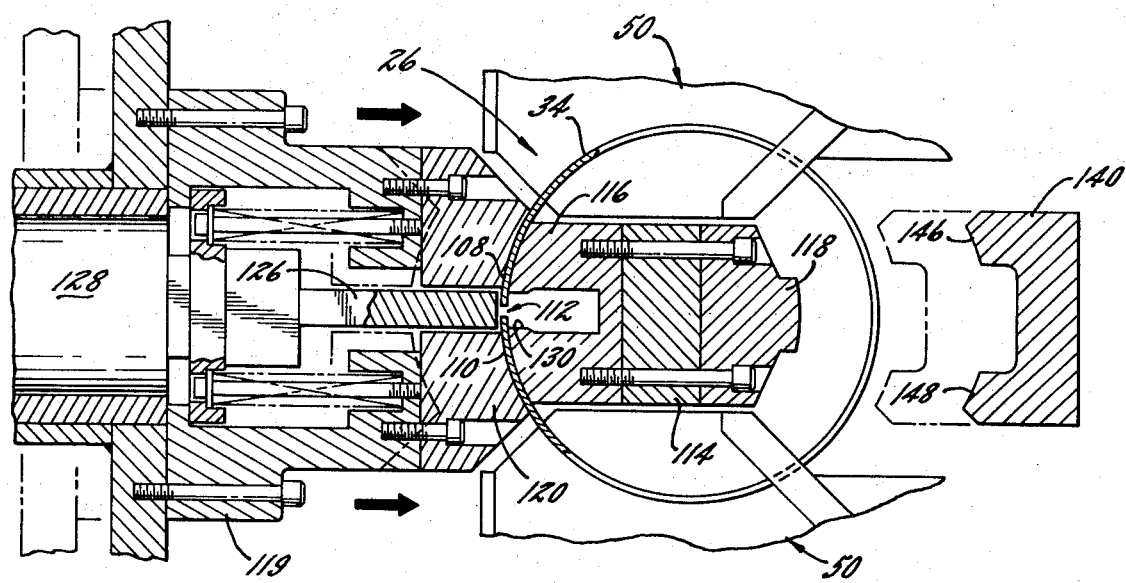
FIG. 7 is a fragmentary enlarged sectional view of the operating station shown in FIG. 3, but with the first stage of the forming operation being performed.

In carrying out the present aspect of the invention, a reciprocating forming ram 119 carrying a forming die 120 is moved toward the horn 114 forcing the shell 34 clamped to the slide 50 to move against horn die 116 which finishes the rounding of the shell ends 108, 110, as best shown in FIG. 7.

Since the end edges at the gap 112 of the shell 34 (FIG. 9) may still be fairly rough from stock cutting operations and also may be slightly distorted from forming, provision is made for shearing off the end portions 108, 110 adjacent the gap 112. The shearing or trimming is accomplished by a cutter 126 reciprocably dispossed within the center of the ram 119 and die 120. The cutter is operated by fluid cylinder 128 also carried by the ram 119. The shearing or cutting action is performed against a cutting slot 130 provided in die 116.

Figure 8:
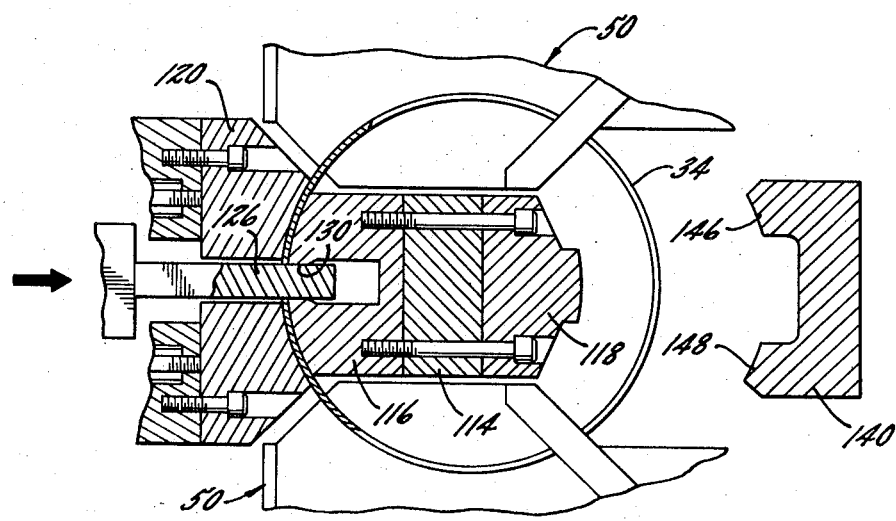
FIG. 8 is a further fragmentary view of the operating station as shown in FIG. 7 with the second stage or edge cutting operation being performed after the operation of FIG. 8.
Figure 9:
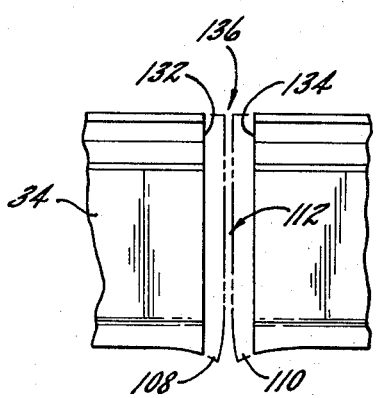
FIG. 9 is a fragmentary view of the shell ends showing how they appear after the stroke of the first stage forming operation (in phantom) and the cutting operation (in full lines)
Figure 10:
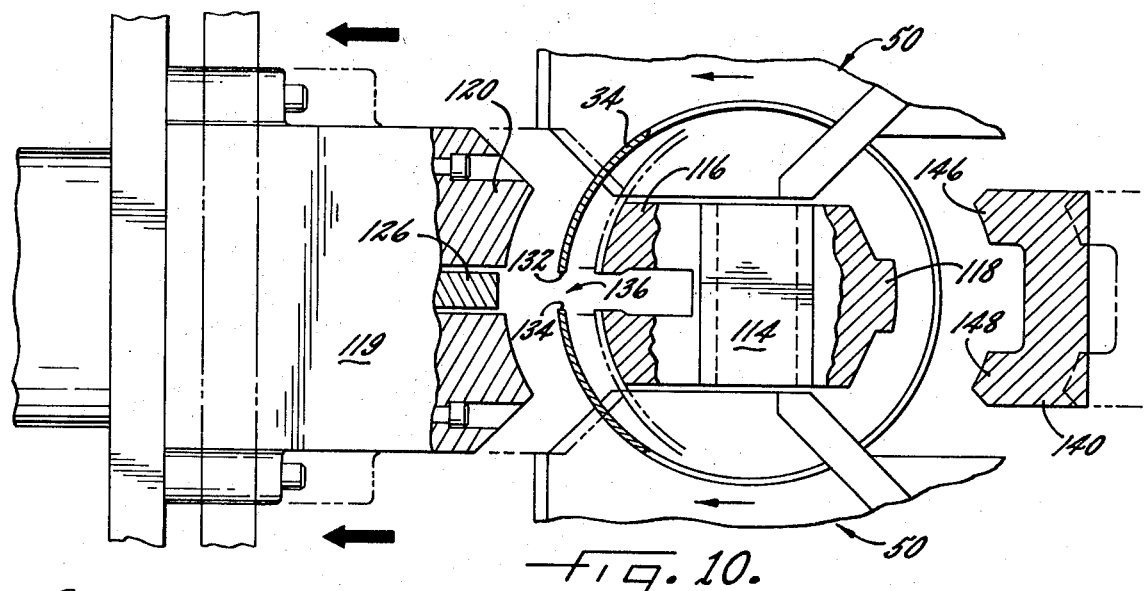
FIG. 10 is a fragmentary view of the operating station as shown in FIG. 3 after completion of the initial forming and cutting with the shell recentered.

Referring to FIGS. 8 and 9 conjointly, it may be seen that the stroke of the cutter 126 removes the ends 108, 110 leaving newly formed trimmed ends 132, 134 and a slightly wider gap 136. When the ram 119 is retracted by actuation of cylinders 122, 124 in the opposite direction, FIG. 10, the centering mechanism for slides 50 described above automatically returns the shell 34 clamped on the lifter slides to a concentric position with respect to the horn 114.

It will be appreciated that the cutter 126 need not be actuated by a separate cylinder 128, but it may be mounted with respect to the ram 119 using a spring pack or the like. With such an arrangement, the movement of the ram 119 by cylinders 122, 124 will bring the die 120 into forming position and then continued movement of the cylinders urges the cutter 126 forward for the trimming operation.

Edge Closing Apparatus

Figure 11:
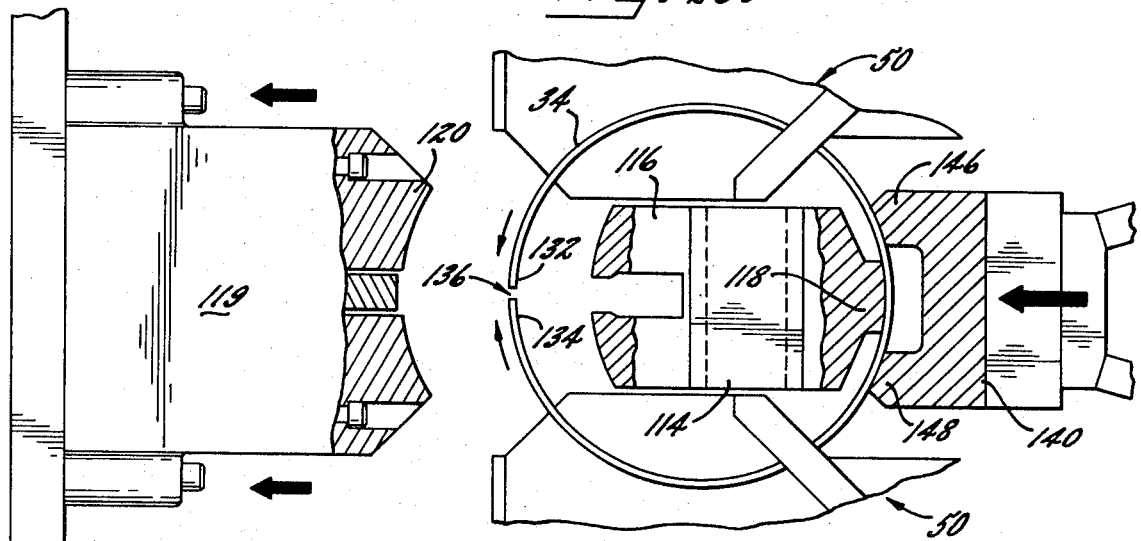
FIG. 11 is a fragmentary view similar to FIG. 3 here showing the end closing operation.
Figure 12:
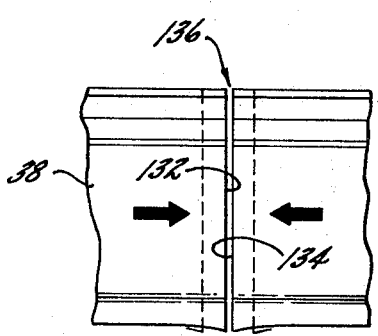
FIG. 12 is a fragmentary side view of the cylindrical shell showing the edges prior to and after the end closing operation of FIG. 11.
Figure 13:
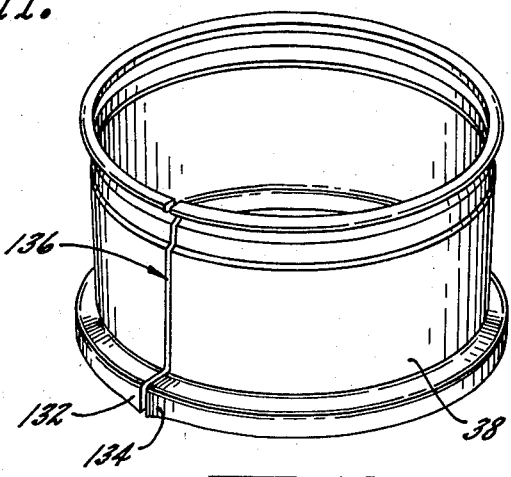
FIG. 13 is a view in perspective of the cylindrical rim or shell as completed by the present apparatus in preparation for welding of the seam.

In accordance with another important aspect of the present invention, provision is made for closing the trimmed end gap 136 of the shell 34 sufficient to permit the welding of the ends in conventional welding apparatus. Thus, referring to FIGS. 3, 6 and 10 conjointly, there is disposed on the opposite side of the horn 114, a closure ram 140 connected via a yoke 142 to rods 144 which are in turn connected to forming ram 119 cylinders 122, 124. The arrangement is such that actuation of the cylinders 122, 124 on the return stroke of forming ram 119 advances the closure ram 140 to move the shell 34 against die 118 so that the spaced apart branches 146, 148 at the face of closure ram 140 straddling the die 118 force the shell ends 132, 134 to move together closing the gap 136 therebetween (FIGS. 11 and 12). The shell indicated at 38 in FIG. 13 is at the stage where ends 132, 134 and end gap 136 are ready to be transferred on to a welder.

Typical Cycle of Operation

In order to more fully understand the apparatus of the present invention, a brief description of the typical cycle of operation will be discussed, beginning with reference to FIG. 1 wherein a cycle "start" position is shown.

As the sequence here shown begins, the overhead transfer clamps 40 are prepared to shift shell 34 from the infeed conveyor 32 to the orienter 48; shell 34' from the orienter to lifters 50; and a previously completed shell 38 to the out feed conveyor 36. This would bring shell 34' in position on the lifters 50 where it would be clamped to hold and maintain the orientation of the shell as shown in FIGS. 4 and 5.

Referring again to FIG. 1, after transfer clamp 40 moves out of the way, rotary actuator 60 is activated to move the lifter downwardly as shown in phantom and the shell is brought into the operating station 26 surrounding the horn 114 (FIG. 6). At this stage, the sequence of operation is best illustrated in FIGS. 7, 8, 10 and 11 which in order show the following:

First, the forward stroke of ram 119 continues toward the horn 114 until the shell clamped on the slides 50 has been formed against the die 116 completing the shape of the shell adjacent the gap. Because of the interconnection of the cylinders 122, 124 moving the ram 119, with the closure ram 140 at the opposite side of the horn, the latter moves away leaving room for the side of the shell which is eccentrically disposed opposite the gap side.

At the end of the forming stroke of ram 119 and while die 120 is still engaged with the shell, cutter 126 is actuated to stroke toward the horn 114 completing the trimming of the ends (FIG. 8). The cutter is then retracted followed by retraction of the ram 119 (FIG. 10) and the centering slides 50 return the shell to a concentric position with respect to the horn 114. Again, because of the interconnection with the closure ram 140, retraction of the ram 119 moves the ram 140 toward the horn 114.

The rams continue their movement to the left a viewed in FIG. 11 until the closure ram 140 has engaged the shell and moved it against the horn die 118 causing the closing of the shell end gap. At this point the rams 119, 140 are moved in the opposite direction bringing them back to their initial positions (FIG. 6) and the shell on the lifters centering slides again returns to the concentric position with respect to the horn in the operating station.

Rotary actuator 60 is then energized to raise the lifter bringing the shell 38 up to the product flow line where it may be picked up by the transfer clamp 40 for placement onto the out feed conveyor 36 as the next shell 34' is brought to the lifter. The cycle of operation then repeats itself for each subsequent shell to be prepared for welding.

It will be appreciated from the foregoing that there has herein been disclosed a relatively simple and convenient combination press apparatus which is highly effective in preparing partially formed cylindrical shells such as truck rims for welding their end gaps wherein the multiple operations necessary to prepare the shell are accomplished on a single machine. The forming apparatus itself is capable of being operated with a wide variety of different diameter shells or rims having the same cross-sectional shape and changeover downtime is minimal to replace any dies that might need to be changed for different width or shaped articles. The edge cutter may be deactivated in the event that cutting is not necessary for some articles with which the apparatus is to be used.

We claim:

1. Apparatus for preparing partially formed cylindrical metal shells moved along a flow path for welding their end gaps comprising, in combination, a frame, a workpiece operating station within the frame, horn means carrying first and second dies on opposite sides thereof disposed in said operating station, first ram means including a forming die disposed adjacent to said first horn die, power means for moving said first ram means toward the horn to form said shell ends adjacent the gap against said first die when said shell is surrounding the horn in the operating station, second ram means carrying a closure die disposed adjacent said second horn die, power means for moving said second ram means toward the horn to compress the opposite side of said shell against said second die and close the end gap, and lifter means for moving a shell workpiece from the flow path into the operating station surrounding said horn and removing it therefrom.

2. Apparatus as claimed in claim 1 wherein said operating station and horn are disposed vertically below the workpiece flow path to and from said lifter and said lifter lowers the shells from said workpiece flow path down over the horn.

3. Apparatus as claimed in claim 2 wherein said lifter includes means for clamping a shell to the lifter for maintaining the shell orientation and self-centering means for maintaining the shell clamped to said lifter concentric with respect to the axis of said horn.

4. Apparatus as claimed in claim 3 wherein said lifter is shiftable transversally with respect to the axis of the horn and said first ram means compressing the shell ends against said first horn die moves the shell and lifter eccentrically with respect to said horn axis, the second ram means compressing said shell against the second die moves the shell and lifter eccentrically in the opposite direction, and said self-centering means returning the shell and lifter to the concentric position with respect to the horn axis after retraction of each of said ram means.

5. Apparatus as claimed in claim 1 wherein said first and second ram means are interconnected so that said second ram means is moved away from said horn when said ram means is moved toward the horn and said second ram means is moved toward the horn when said first ram means is moved away from the horn.

6. Apparatus as claimed in claim 1 wherein said first ram means carries cutting means for trimming the ends of said shell adjacent the gap, power means for actuating said cutting means and cutting slot means on said first die providing cutting edges against which said cutting means operates.

7. Apparatus as claimed in claim 1 including transfer means for moving said shells disposed with their center lines vertical in said flow path.

8. Apparatus for preparing partially formed cylindrical metal shells for welding their end gaps wherein said shells are transported sequentially along a flow path, said apparatus comprising, in combination, a vertically oriented frame disposed below said flow path, a workpiece operating station within the frame, said operating station having horn means carrying first and second dies on opposite sides thereof, lifter means for receiving a shell in said flow path and lowering the shell into the operating station surrounding said horn, said lifter means being transversally movable with respect to the axis of the horn, self-centering means associated with said lifter for normally maintaining a shell carried by said lifter concentric with the axis of said horn, first ram means including a forming die disposed adjacent to said first horn die, power means for moving said first ram towards the horn to shift said shell eccentrically with respect to the horn to form said shell ends adjacent the gap between said first ram die and horn die, said power means retracting said ram means so that the shell is returned to the concentric position with respect to the horn by said lifter centering means, a second ram means carrying a closure die disposed on the opposite side of said horn, power means for moving said second ram means toward the horn shifting said shell to a second concentric position wherein said opposite side of the shell is compressed between said second horn die and the closure die thereby closing the end gap of the shell, said second ram power means retracting the second ram and closure die and said shell being returned to the concentric position with respect to said horn, whereby said lifter means raises said shell to the workpiece flow path.

9. Apparatus as claimed in claim 8 wherein said first and second ram power means are interconnected so that said second ram means is moved away from said horn when said first ram means is moved toward the horn and said second ram means is moved toward the horn when said first ram means is moved away from the horn.

10. Apparatus as claimed in claim 8 wherein said first ram means carries cutting means for trimming the ends of said shell adjacent the gap, power means for actuating said cutting means and cutting slot means on said first die providing edges against which said cutting means operates.

* * * * *